United States Patent [19]
Labelle et al.

[11] Patent Number: 6,105,805
[45] Date of Patent: Aug. 22, 2000

[54] PORT CLOSURE FOR A TANK

[76] Inventors: Robert Jacques Labelle, 243 Hunberstone Road, Edmonton, Alberta, Canada, T5C 4C5; Richard Donald Lyseng, 4818-47 Avenue, Beaumont, Alberta, Canada, T4X 1G6

[21] Appl. No.: 09/189,339

[22] Filed: Nov. 10, 1998

[30] Foreign Application Priority Data

Aug. 26, 1998 [CA] Canada ................................. 2245998

[51] Int. Cl.⁷ ................................................ B65D 43/26
[52] U.S. Cl. .................. 220/262; 220/345.2; 220/345.4; 220/345.6
[58] Field of Search ................................. 220/260, 262, 220/345.1, 345.2, 345.4, 345.6, 349

[56] References Cited

U.S. PATENT DOCUMENTS

| | | | |
|---|---|---|---|
| 672,641 | 4/1901 | Hirt | 220/345.6 X |
| 1,124,395 | 1/1915 | Cottrell | 220/345.1 X |
| 2,224,094 | 12/1940 | Small | 220/345.2 X |
| 2,842,283 | 7/1958 | Smith | 220/349 X |
| 3,131,925 | 5/1964 | Coats | 220/262 X |
| 3,142,410 | 7/1964 | Arnold | 220/262 |
| 3,339,785 | 9/1967 | Nugent | 220/345.6 X |
| 4,709,901 | 12/1987 | Pierson et al. | |
| 5,190,182 | 3/1993 | Copas et al. | 220/345.6 X |
| 5,507,408 | 4/1996 | Mosior et al. | 220/345.2 |

*Primary Examiner*—Stephen K. Cronin
*Attorney, Agent, or Firm*—Christensen O'Connor Johnson & Kindness +hu PLLC

[57] ABSTRACT

A port closure is a combination which includes a tank, a closure member and an actuator. The tank has defining walls, an exterior surface, an interior surface, an interior cavity and an access port. The closure member is disposed within the interior cavity of the tank. The closure member has an access port engaging face that is larger than a cross-sectional area of the access port. The actuator is coupled with the closure member and moves the closure member between a first position in which the access port engaging face closes the access port and a second position laterally spaced from the access port.

14 Claims, 14 Drawing Sheets

PORT CLOSURE FOR A TANK

FIELD OF THE INVENTION

The present invention relates to a port closure for storage and transport tanks and, in particular a port closure that can withstand a pressure differential.

BACKGROUND OF THE INVENTION

Every storage tank and transport tank has an access port. The access port may be large enough for a person to enter for the purpose of inspecting the interior of the tank or the access port may be only large enough to permit the passage of matter into the tank. With some commodities it is important that the tanks have port closures that can withstand a pressure differential between internal and external pressure. For example, in tanks used for the storage or transportation of granular or powder form dry bulk goods (such as flour, salt, cement, lime, and cereal grains) the contents are pneumatically transferred. Pneumatic transfer systems do not work properly unless the closure on the access port can maintain a pressure differential between interior pressure and exterior pressure.

The port closures in common use for such applications at the present time consist of an external lid. This external lid is held in position by a series of camlocks spaced evenly about a circumference of the access port. These closures have a number of problems. A first problem is that they are prone to leakage. A second problem is that the camlocks must be manually released. This requires a person to climb up onto the tank, and creates a potential safety hazard. The severity of the hazard depends upon the height of the tank, lighting conditions, weather conditions (wind, rain, etc), and other surrounding circumstances. A third problem is that care must be taken to ensure that the pressure within the interior of the tank is released prior to attempting to open the closure. If a pressure differential exists, the closure will open under pressure with a violent force. This violent opening force has resulted in a number of injuries and deaths as the person opening the closure has been struck by the closure and, in some cases, knocked off of the tank.

SUMMARY OF THE INVENTION

What is required is an alternative form of port closure for a tank.

According to the present invention there is provided a port closure for a tank. The port closure involves a combination which includes a tank, a closure member and an actuator. The tank has defining walls, an exterior surface, an interior surface, an interior cavity and an access port. The closure member is disposed within the interior cavity of the tank. The closure member has an access port engaging face that is larger than a cross-sectional area of the access port. The actuator is coupled with the closure member and moves the closure member between a first position in which the access port engaging face closes the access port and a second position laterally spaced from the access port.

The port closure, as described above, provides a number of advantages over an externally applied cam-lock lid. As the port closure is installed within the interior cavity of the tank, internal pressure within the tank tends to press the closure member against the access port; thereby reducing the possibility of leakage. The port closure is moved between the first position closing the access port and the second position by the actuator. There is no need for the closure member to be manually opened. This virtually eliminates the safety hazards formerly associated with opening and closing the access port.

There are various forms of actuators that can be used for the remote actuation of the closure member. The preferred form is a telescopically extendible member. For example, the telescopically extendible member can consist of a cylinder connected by fluid lines to a fluid control system that controls the supply of fluid to the cylinder to telescopically expand and contract said cylinder. This enables the closure member to be moved between the first position and the second position either hydraulically or pneumatically. With a transport tank, the hydraulic or pneumatic lines can be run off of the hydraulic or pneumatic systems of the transport vehicle.

Although beneficial results may be obtained through the use of a port closure, as described above, such a port closure can only be installed in a tank during fabrication. It is impossible to retrofit an existing tank with such a port closure installed within the interior cavity of the tank without taking the tank apart. What is required is a port closure that can be used to retrofit existing tanks. Even more beneficial results may, therefore, be obtained when the closure member consists two or more components. Individual components are capable of being inserted through the access port but incapable of individually covering the cross-sectional area of the access port. However, when the two or more components are combined they collectively form the closure member. The closure member with two or more components can take a number of forms, several of which will hereinafter be described.

Although beneficial results may be obtained through the use of a port closure, as described above, there are measures that can be taken to improve the sealing engagement between the closure plate and the access port. Even more beneficial results may, therefore, be obtained when a seal is mounted to either the defining walls on the interior surface of the tank circumjacent the access port or the access port engaging face of the closure member.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

The preferred embodiment, a port closure for a tank generally identified by reference numeral 10, will now be described with reference to FIGS. 1 through 15c.

Figure 1:
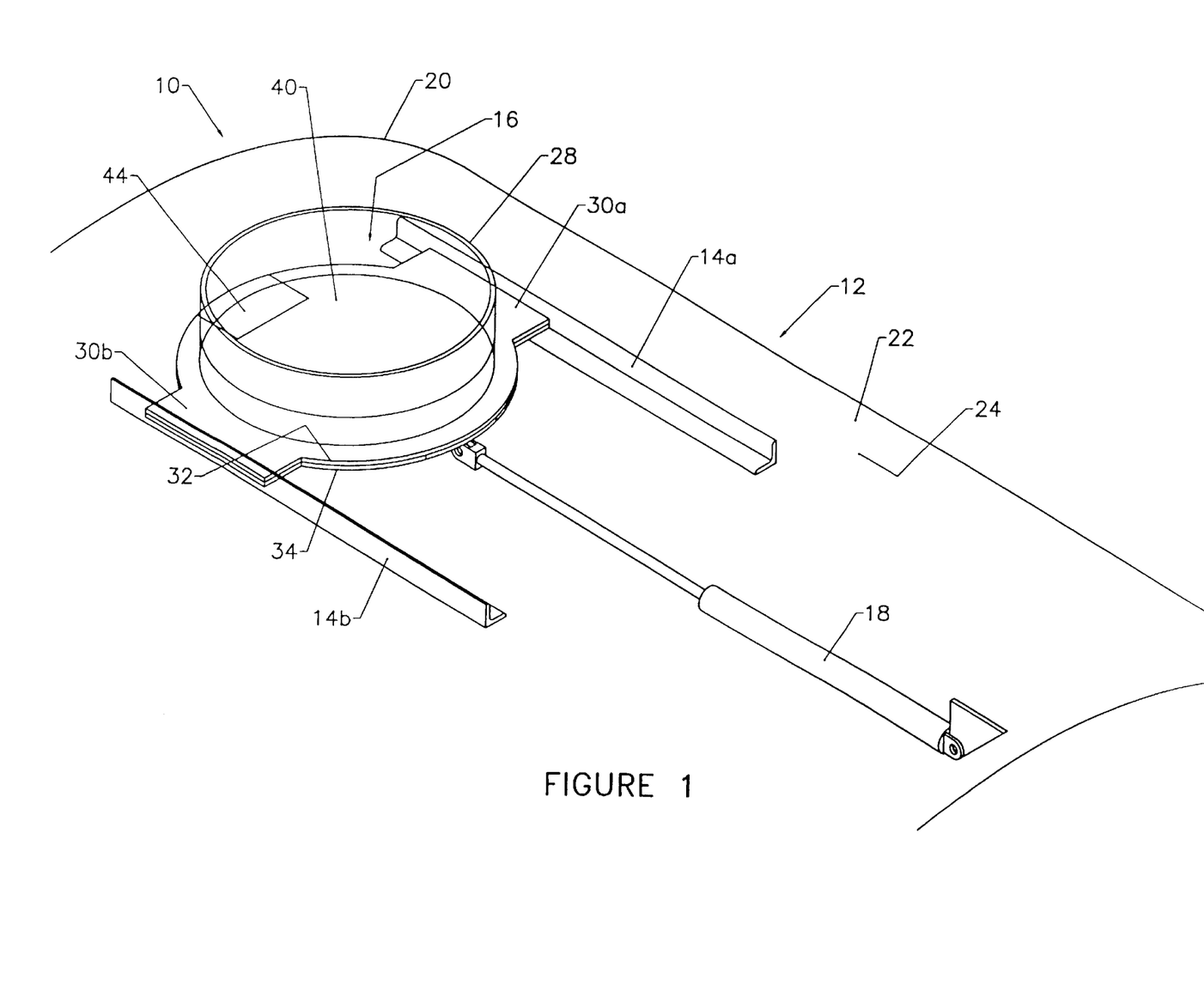
FIG. 1 is a cutaway perspective view of a port closure for a tank constructed in accordance with the teachings of the present invention with the closure member in a first position closing an access port.
Figure 4:
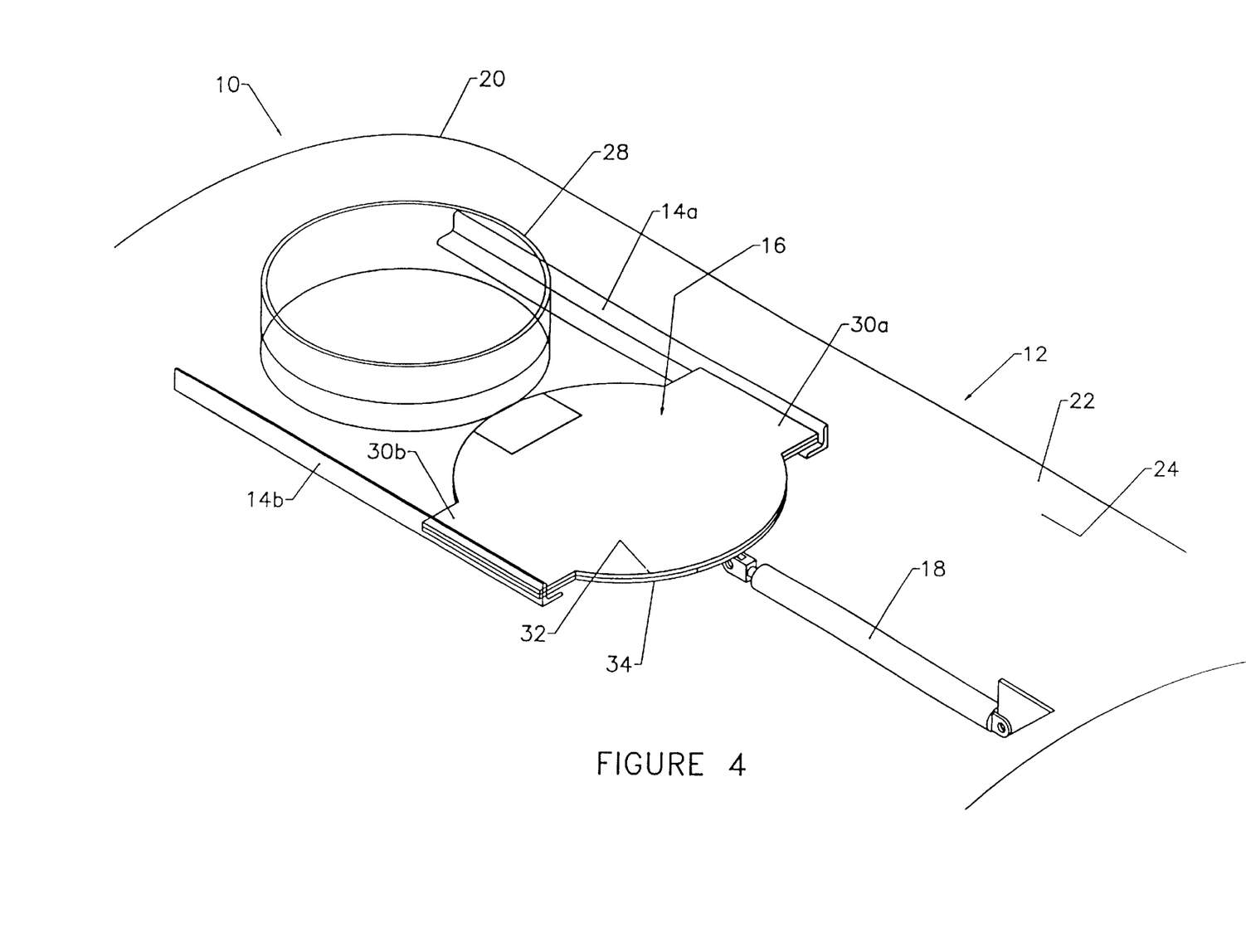
FIG. 4 is a cutaway perspective view of a port closure for a tank constructed in accordance with the teachings of the present invention with the closure member in a second position laterally spaced from an access port.

Referring to FIGS. 1 and 4, port closure 10 includes a combination of a tank 12, a pair of guide tracks 14a and 14b, a closure member in the form of a closure plate 16 and a remotely controlled actuator preferably in the form of a telescopically extendible cylinder 18. Tank 12 has defining walls 20, an exterior surface 22, an interior surface 24, an interior cavity 26 and an access port 28. One of the pair of guide tracks 14a and 14b is mounted to the defining walls 20 on the interior surface 24 of the tank 12 on each of two opposed sides of the access port 28.

Closure plate 16 has a pair of opposed track engaging edges 30a and 30b. The track engaging edges 30a and 30b are engaged with the pair of guide tracks 14a and 14b. Closure plate 16 is movable along the guide tracks 14a and 14b between a first position closing the access port 28, illustrated in FIGS. 1 through 3, and a second position laterally spaced from the access port 28, illustrated in FIGS. 4 through 6.

When a closure plate 16 is to be fitted into a new tank 12 closure plate 16 can be constructed from a single planar sheet of material. When it is necessary to retrofit an existing tank 12 without opening up said tank 12 closure plate 16 is constructed inside tank 12 from more than one components each of which is capable of being passed through access port 28 as will now be described with reference to FIGS. 7 through 9.

Figure 7:
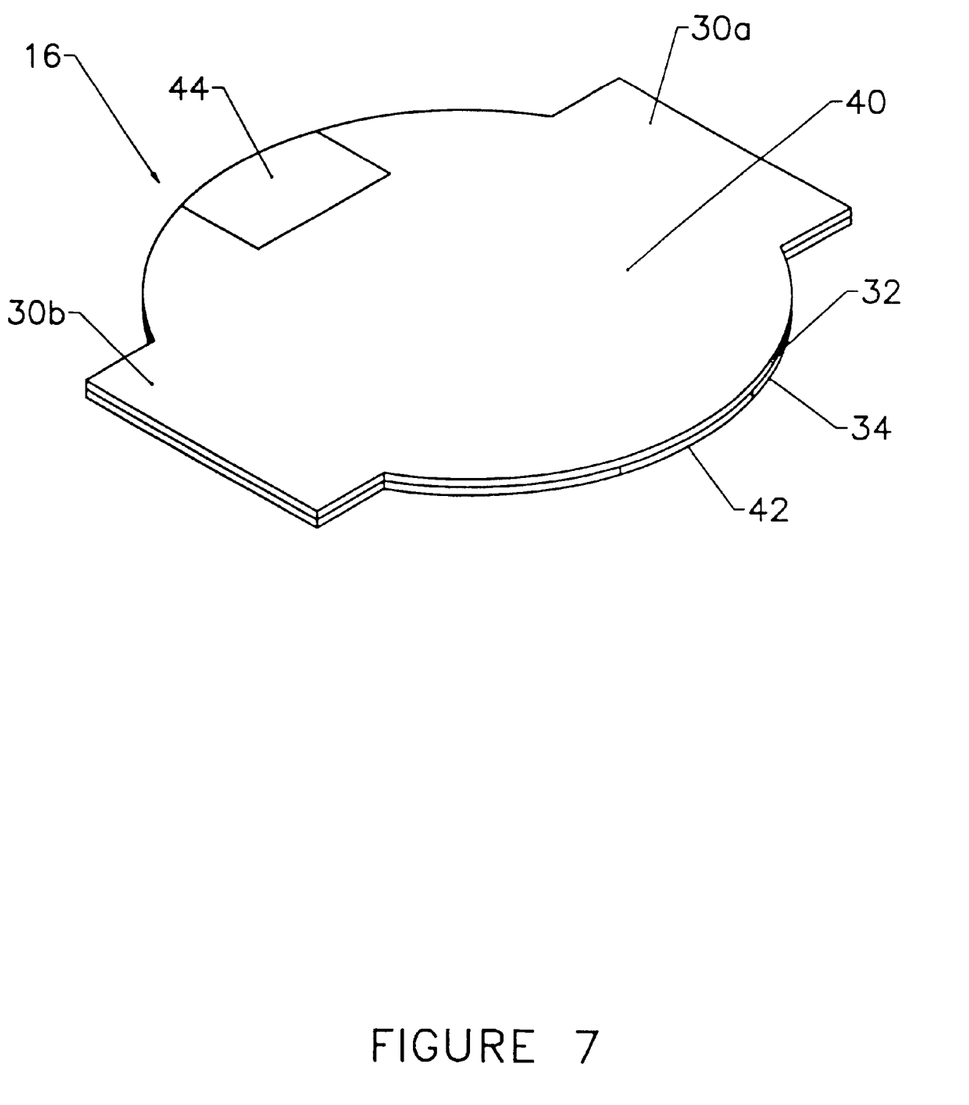
FIG. 7 is a perspective view of a closure member of the port closure for a tank illustrated in FIGS. 1 and 4.
Figure 8:
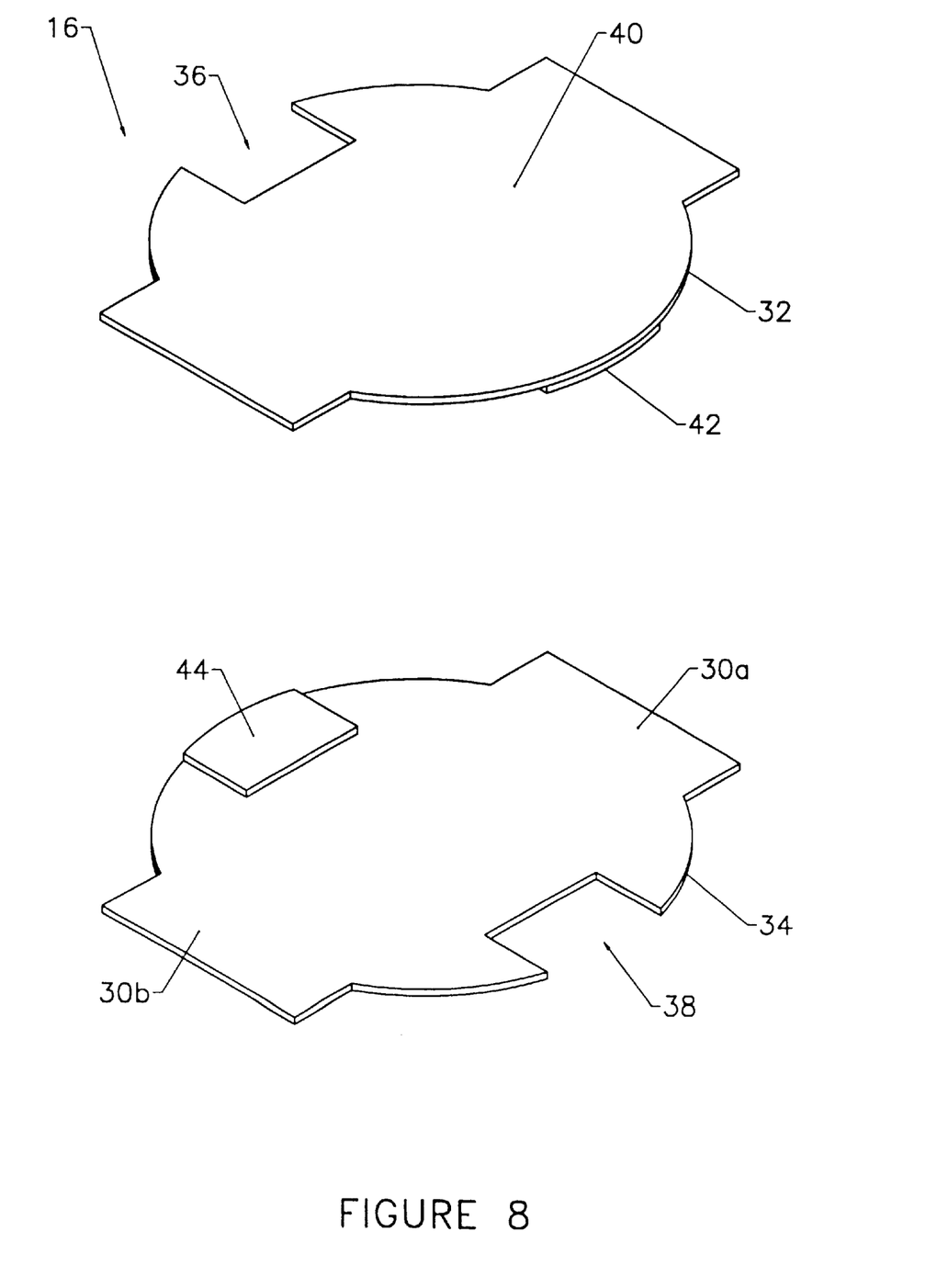
FIG. 8 is an exploded perspective view of the closure member of the port closure for a tank illustrated in FIG. 7, showing a first layer and a second layer.
Figure 9A:
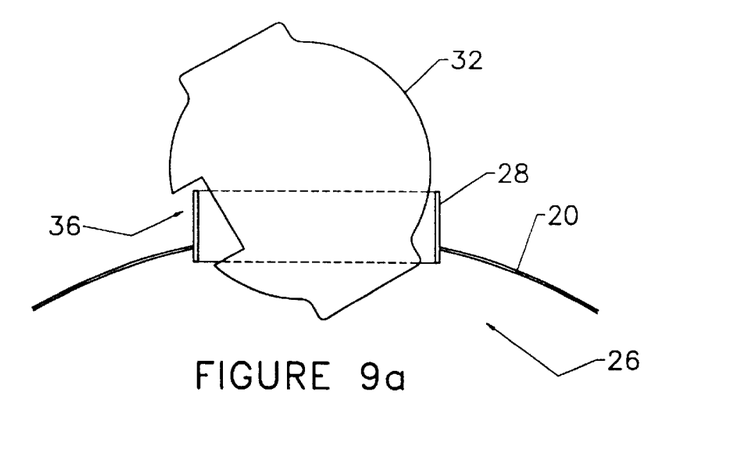
FIGS. 9a through 9f are sequential side elevation views, in section, of an access port of a tank, showing a manner of inserting one of the first layer or the second layer through the access port.
Figure 9B:
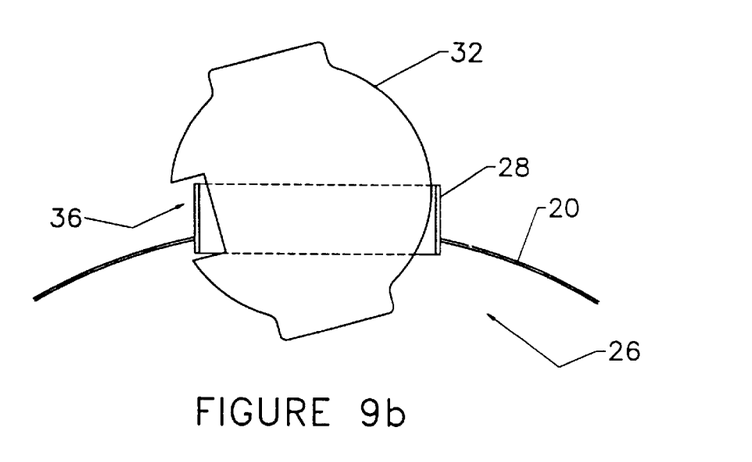
Figure 9C:
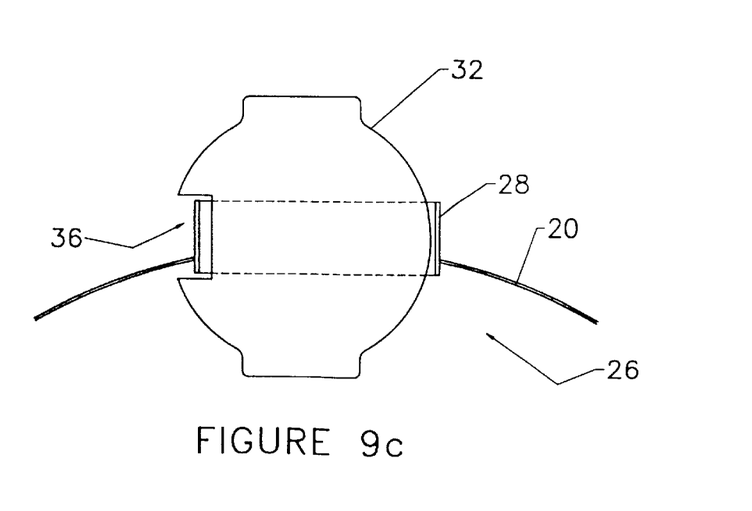
Figure 9D:
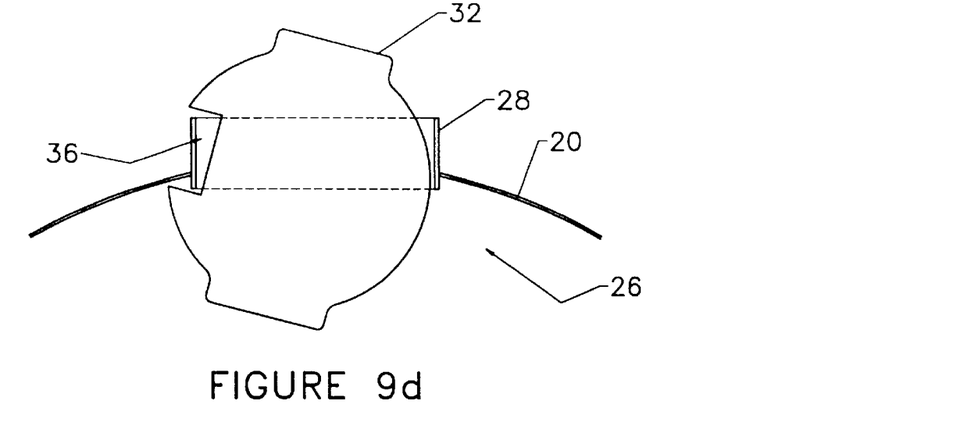
Figure 9E:
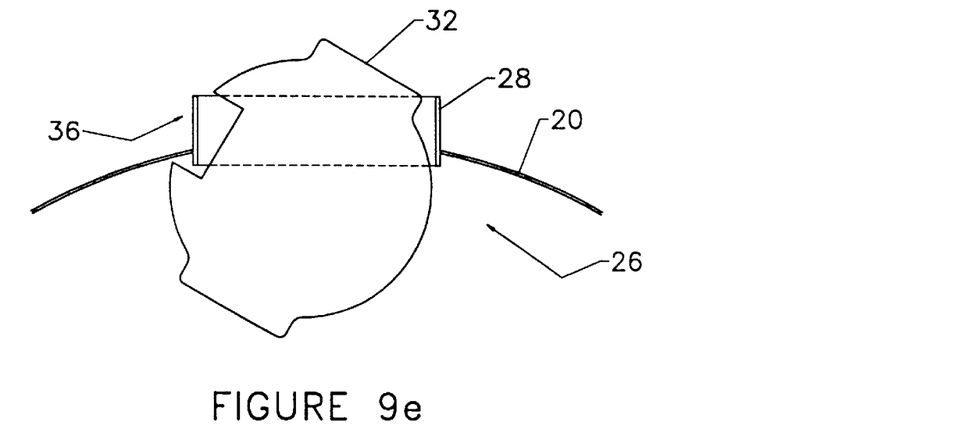
Figure 9F:
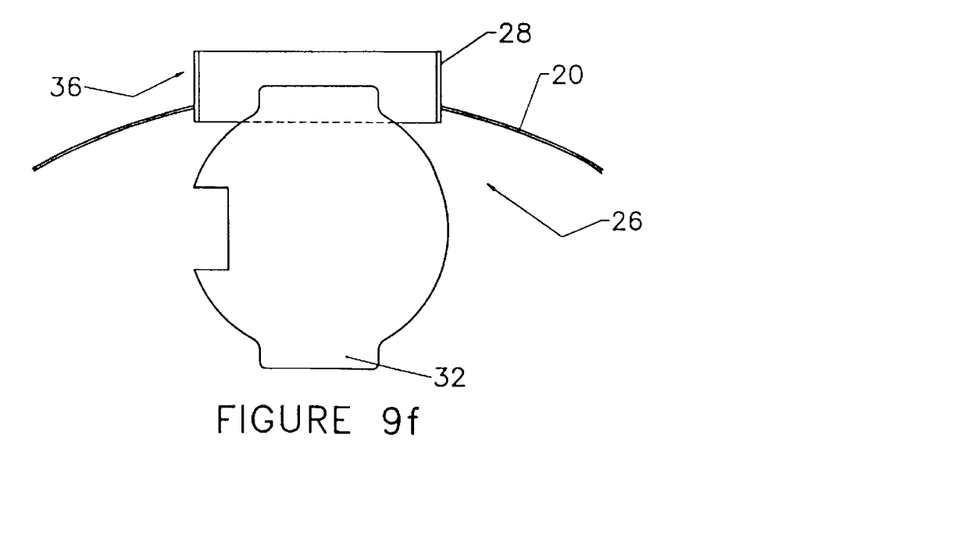

Referring to FIGS. 7 and 8, closure plate 16 includes a first layer 32 and a second layer 34. First layer has a first cut out portion 36 that permits first layer 32 to be inserted through access port 28, as illustrated in FIGS. 9a through 9f, but renders first layer 32 incapable of completely covering the cross-sectional area of access port 28. Second layer 34 has a second cut out portion 38 that permits second layer 34 to be inserted through access port 28 in the same manner as first layer 32 but renders second layer 34 incapable of completely covering the cross-sectional area of access port 28.

Referring to FIG. 7, first layer 32 and second layer 34 are secured in face to face relation to collectively form the closure plate 16 with an access port engaging face 40 larger than the cross-sectional area of the access port 28. First layer 32 and second layer 34 have interlocking members 42 and 44 respectively which, when interlocked, make the access port engaging face 40 and the opposed face 46 of closure plate 16 planar.

Figure 3:
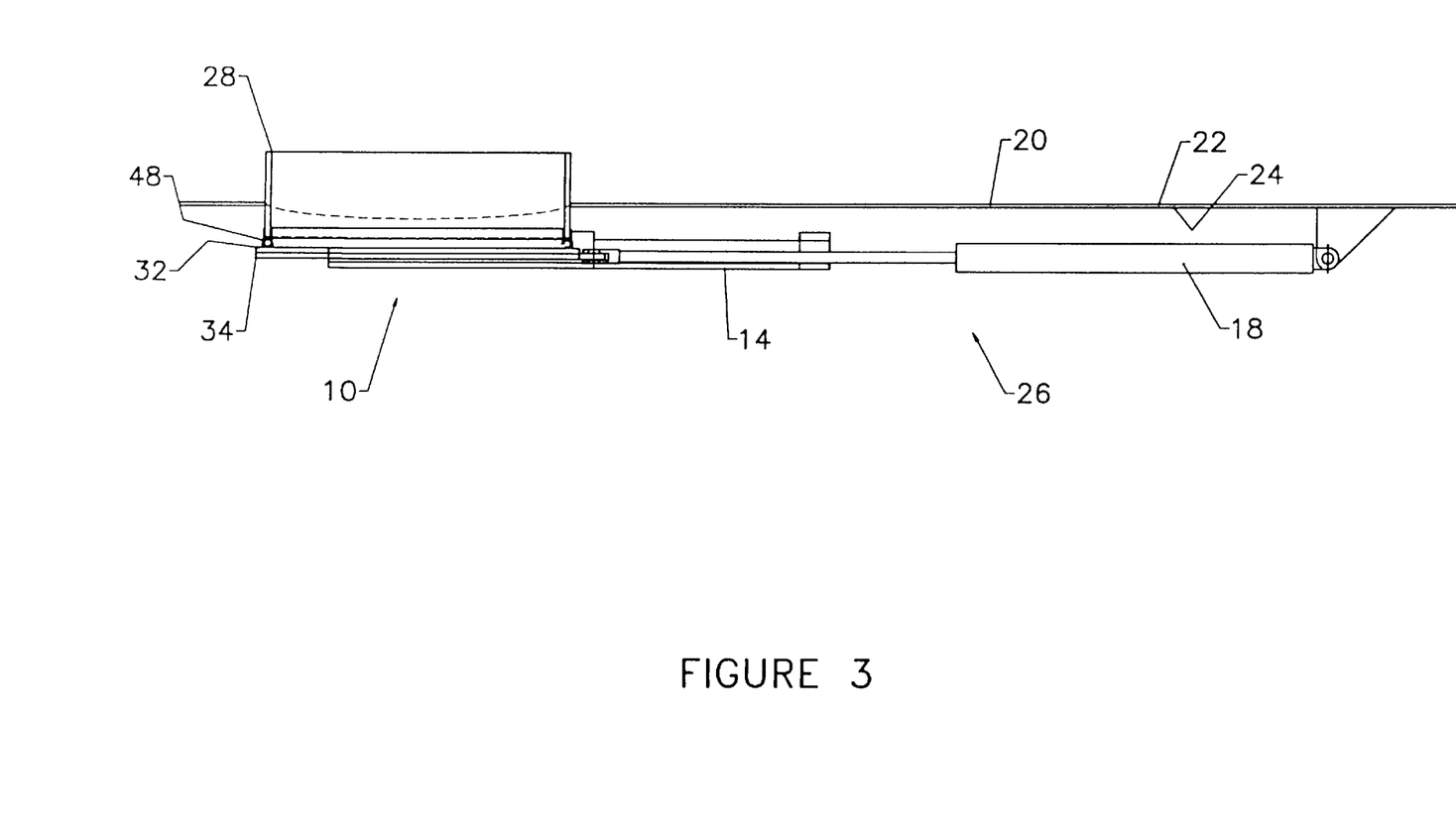
FIG. 3 is side elevation view, in section of the port closure for a tank illustrated in FIG. 1.
Figure 6:
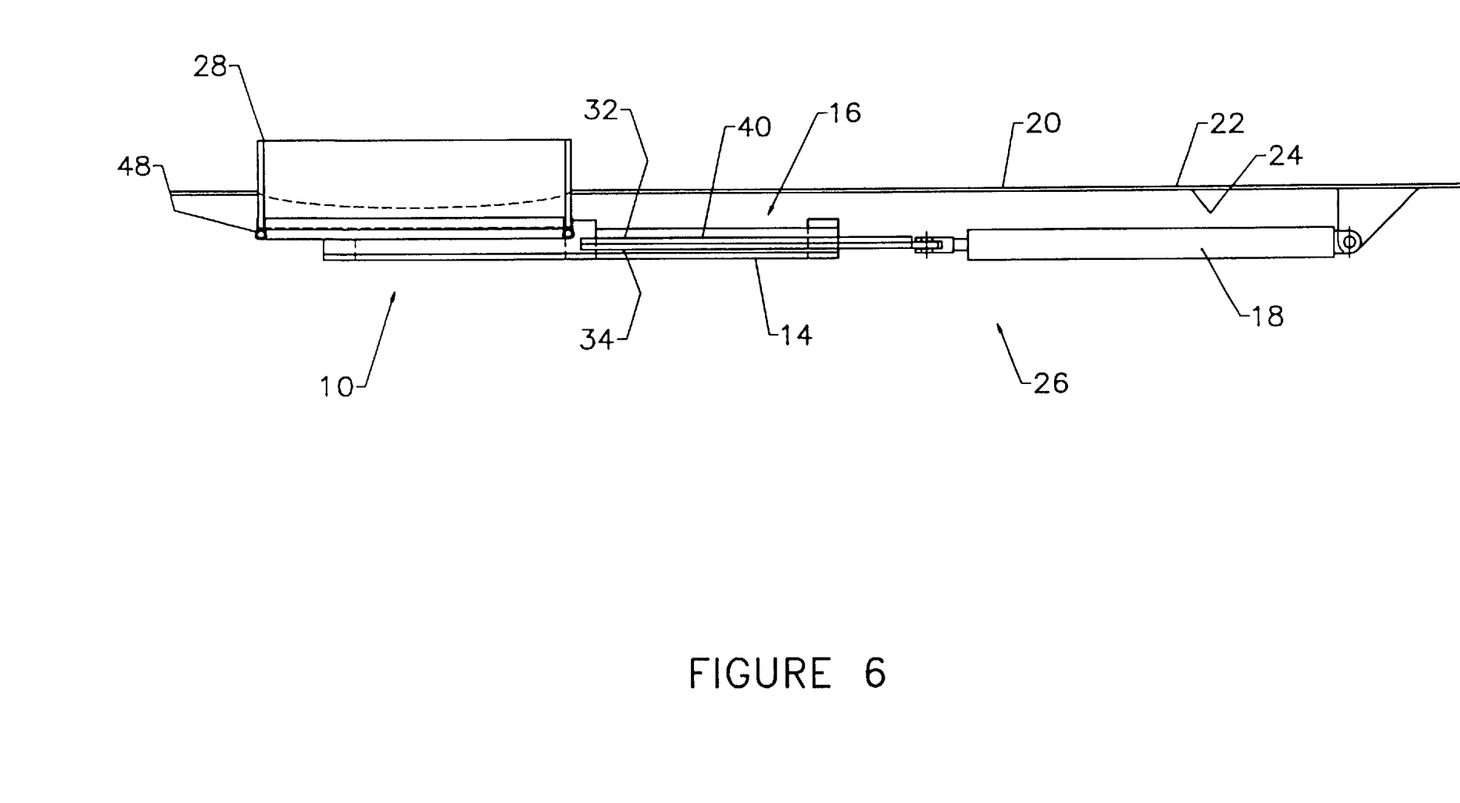
FIG. 6 is side elevation view, in section of the port closure for a tank illustrated in FIG. 4.

Referring to FIGS. 3 and 6, a seal ring 48 is mounted to the defining walls 20 on the interior surface 24 of tank 12 circumjacent the access port 28. Seal ring 48 sealingly engages the access port engaging face 40 of closure plate 16 when closure plate 16 is in the first position closing the access port 28 as illustrated in FIG. 3.

Referring to FIGS. 1 through 6, a remotely controlled actuator means such as telescopically extendible actuator cylinder 18 is coupled with closure plate 16 to allow remotely controlled movement of closure plate 16. Cylinder 18 is connected by fluid lines to a remotely located fluid control system (not shown) that controls the supply of fluid to cylinder 18 to telescopically expand and contract cylinder 18, thereby moving closure 16 between the first position illustrated in FIGS. 1 through 3 and the second position illustrated in FIGS. 4 through 6.

Figure 2:
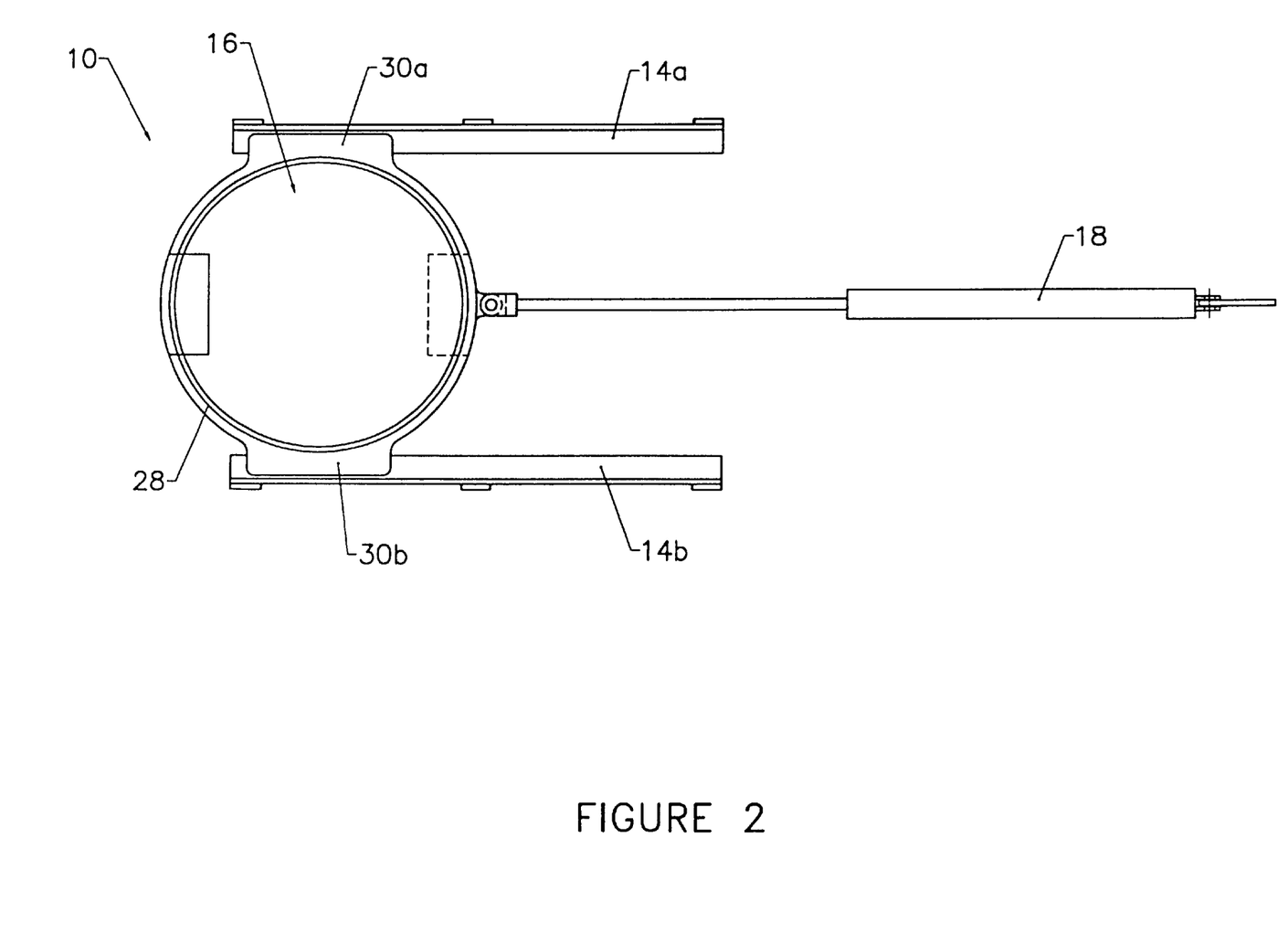
FIG. 2 is a top plan view of the port closure for a tank illustrated in FIG. 1.
Figure 5:
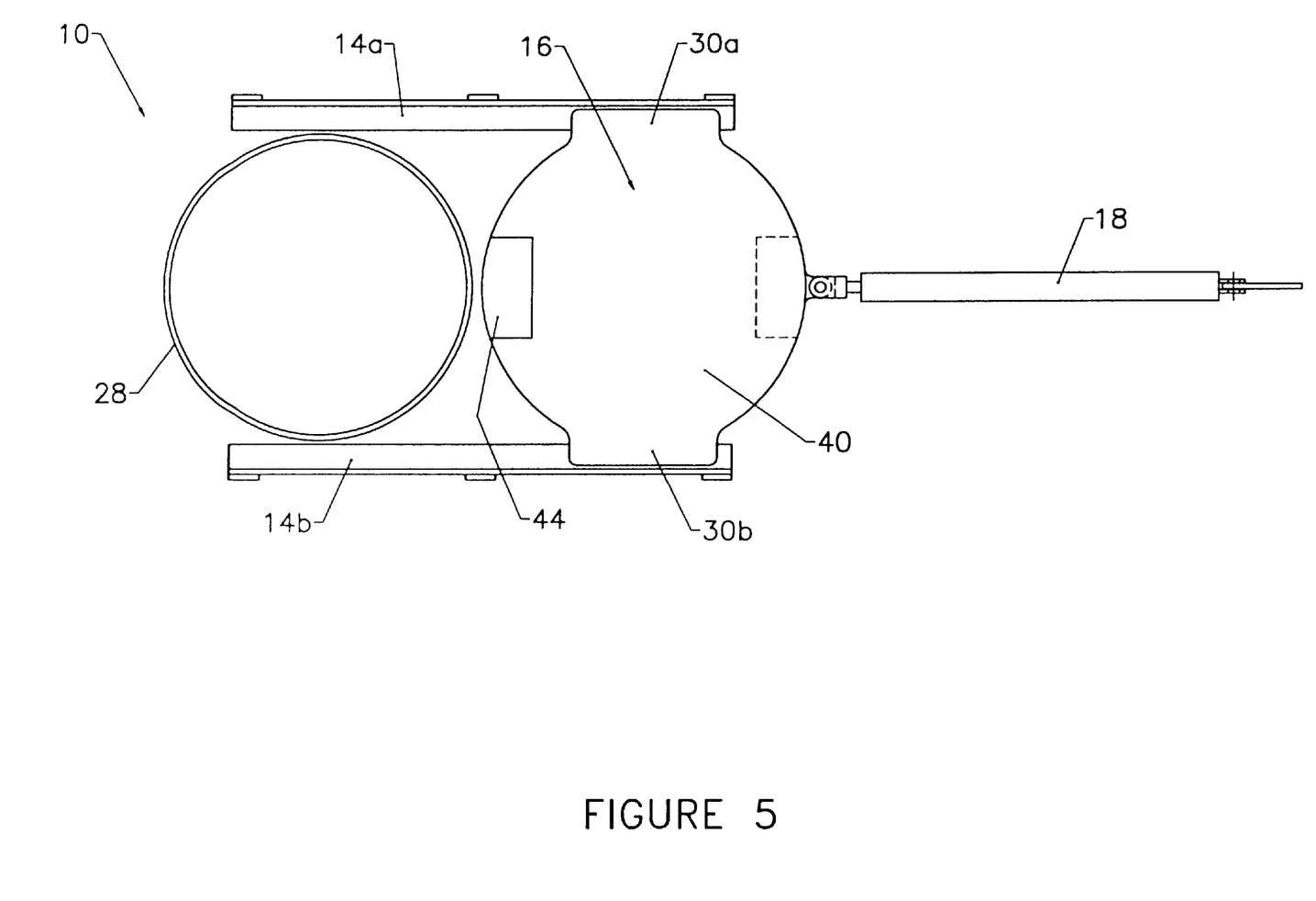
FIG. 5 is a top plan view of the port closure for a tank illustrated in FIG. 4.

The use and operation of port closure 10 will now be described with reference to FIGS. 1 through 15c. In order to retrofit an existing tank 12 with port closure 10, layers 32 and 34 are passed through access port 28 in the manner illustrated sequentially in FIGS. 9a through 9f. Then, first layer 32 and second layer 34 are secured in face to face relation by an adhesive to collectively form closure plate 16, in the manner illustrated in FIG. 7. Closure plate 16 is movable along guide tracks 14a and 14b between a first position closing access port 28, as illustrated in FIGS. 1 through 3, and a second position laterally spaced from access port 28, as illustrated in FIGS. 4 through 6. Cylinder 18 telescopically expands or contracts to move closure plate 16 from the first position closing access port 28 to the second position laterally spaced from access port 28. The movement of cylinder 18 is hydraulically or pneumatically controlled from a remotely located location, such as a cap of a transport vehicle or a control room of a storage facility. Should pressure increase within tank 12, the pressure will force access port engaging face 40 of closure plate 16 into increased sealing engagement with seal ring 48.

Figure 10:
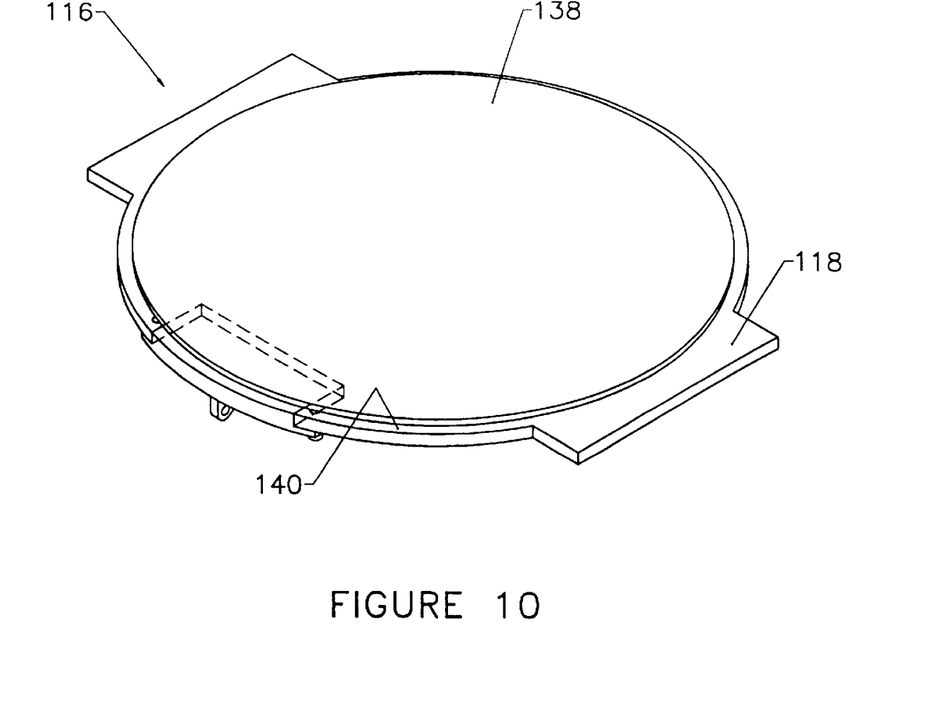
FIG. 10 is a top perspective view of a first alternative form of closure member constructed in accordance with the teachings of the present invention.
Figure 11:
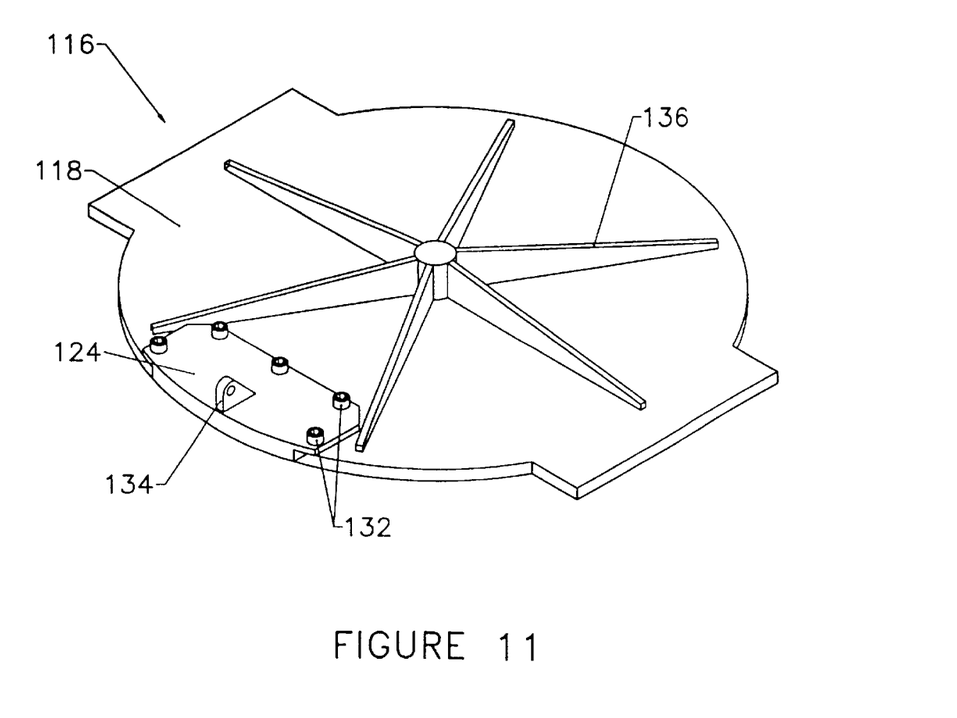
FIG. 11 is a bottom perspective view of the first alternative form of closure member illustrated in FIG. 10.
Figure 12:
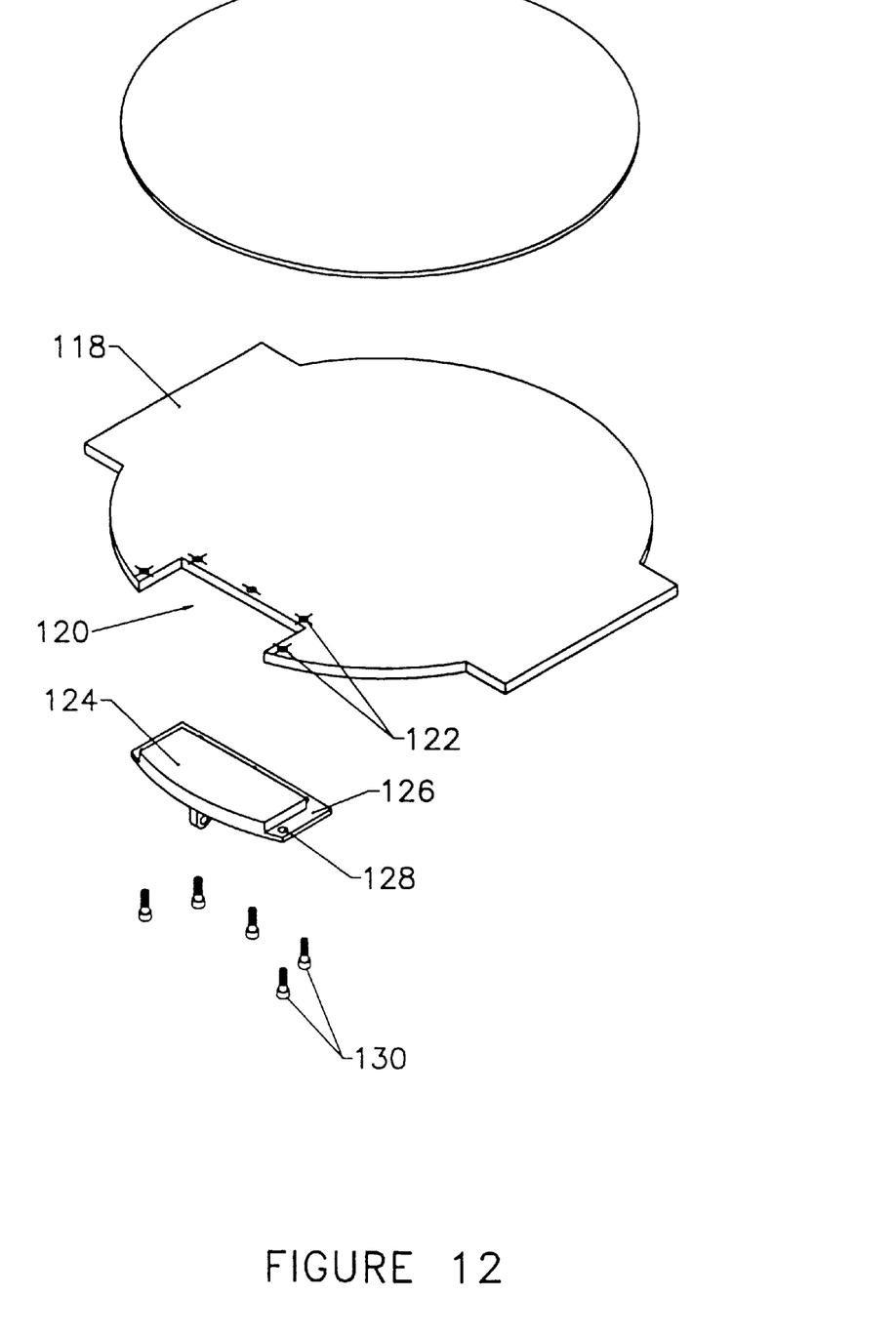
FIG. 12 is an exploded perspective view of the first alternative form of closure member illustrated in FIG. 10.

It will be apparent to one skilled in the art that modifications may be made to the illustrated embodiment without departing from the spirit and scope of the invention as hereinafter defined in the claims. Some modifications will now be described with reference to FIGS. 10 through 15c. Referring to FIGS. 10 through 12, there is illustrated a first alternative form of closure member, generally identified by reference numeral 116. Referring to FIG. 12, Closure member 116 has a primary component 118 with a cut out portion 120 that permits primary component 116 to be inserted through an access port in the same manner as illustrated in FIGS. 9a through 9f. However, cut out portion 120 renders primary component 118 incapable of covering the cross-sectional area of the access port. Primary component 116 has a plurality of bolt receiving openings 122 positioned around a periphery of cut out portion 120. A secondary component 124 is provided which, when combined with primary component 116, fills cut out portion 120. Secondary component 124 has a flange 126 that has a plurality of bolt receiving openings 128. Secondary component 124 is secured to primary component 116 by a plurality of threaded screws or bolts 130 that extend through bolt receiving openings 128 and 122. It will be apparent to one skilled in the art that, if desired, there can be more than one secondary component 124. In most installations, only one secondary component 124 will be necessary. Referring to FIG. 11, there is illustrated the manner in which bolts 130 are secured in place by nuts 132. It is preferred for ease of handling that secondary component 124 have an attachment member 134. The reason for this is that secondary component 124 is relatively small and if a line is not secured to attachment member 134 there is a danger it could be accidentally dropped into the tank. It is also preferred that when primary component 116 consists of a single plate, that reinforcing members 136 be provided. In the embodiment illustrated in FIGS. 3 and 6, the form of seal used is a ring seal 48. Referring to FIGS. 10 and 12, there is illustrated an alternative form of seal 138. Seal 138 consists of a resilient sealing layer secured by adhesive to access port engaging face 140 of closure member 116.

Figure 13:
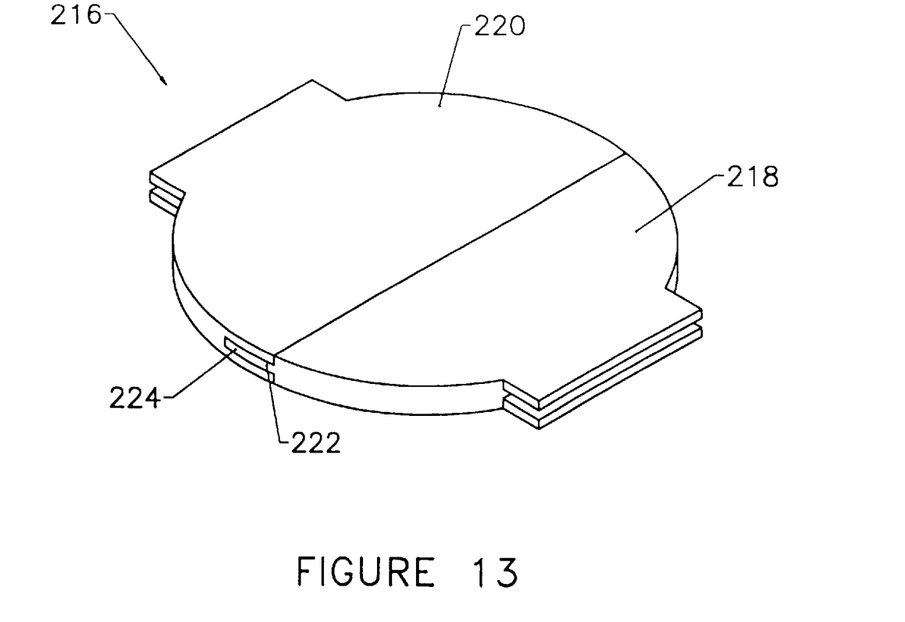
FIG. 13 is a perspective view of a second alternative form of closure member constructed in accordance with the teachings of the present invention.
Figure 14:
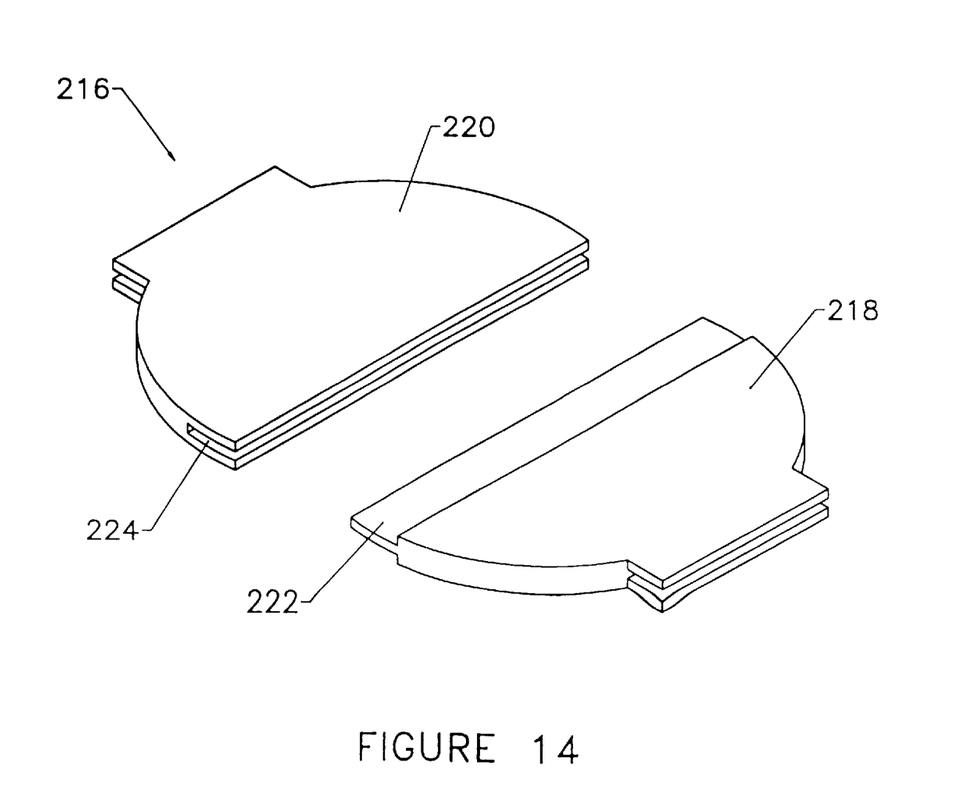
FIG. 14 is an exploded perspective view of the second alternative form of closure member illustrated in FIG. 13.

Referring to FIGS. 13 and 14, there is illustrated a second alternative form of closure member, generally identified by reference numeral 216. Closure member 216, as illustrated consists of two interlocking components 218 and 220. The manner of interlock illustrated can be described as a tongue in groove or a male to female interlock. Interlocking component 218 has a male interlocking tongue 222. Interlocking component 220 has a female interlocking groove 224. It would be apparent to one skilled in the art that there are other forms of interlock that would also be suitable.

Figure 15A:
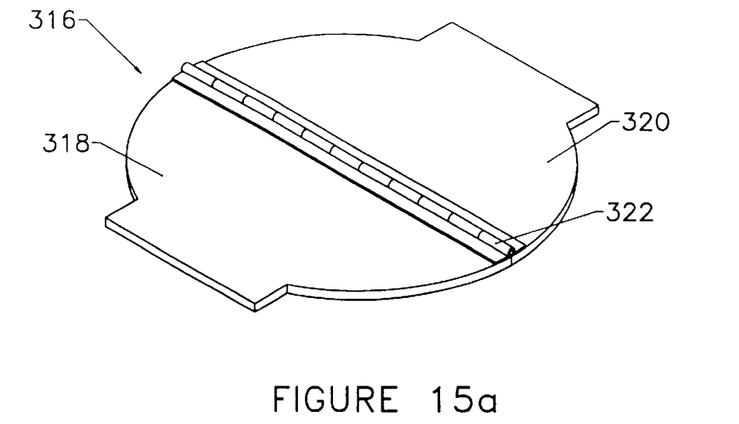
FIGS. 15a through 15c are sequential perspective views, of a third alternative form of closure member, showing a manner of pivoting the components about a hinge for the purpose of insertion through the access port.
Figure 15B:
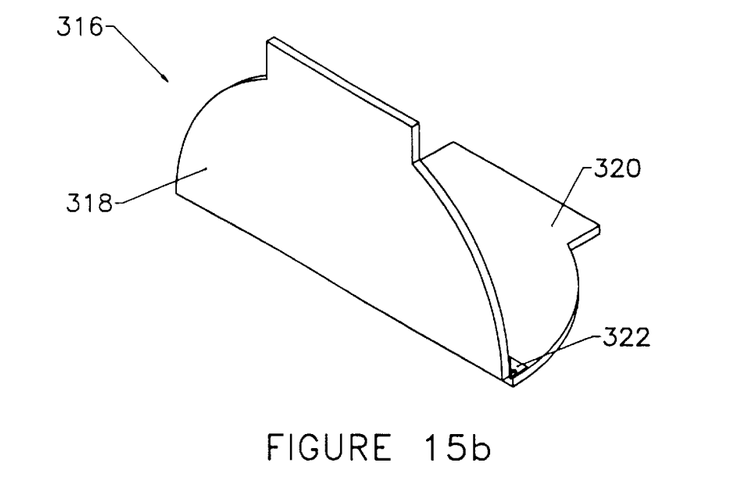
Figure 15C:
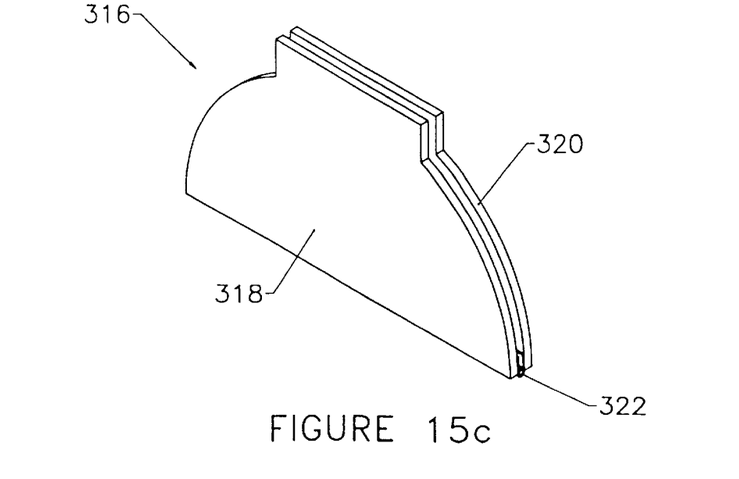

Referring to FIGS. 15a through 15c, there is illustrated a third alternative form of closure member, generally identified by reference numeral 316. Closure member 316 consists of two components 318 and 320 which are coupled with a hinge 322. When engaged in guide tracks 14a and 14b, closure member 316 is maintained in a planar attitude as illustrated in FIGS. 15a. FIGS. 15b and 15c illustrated how closure member 316 can be folded about hinge 322 for insertion through an access opening.

It will finally be apparent to one skilled in the art that there are other modifications may be made to the illustrated embodiments without departing from the spirit and scope of the invention as hereinafter defined in the claims.

The embodiments of the invention in which an exclusive property or privilege is claimed are defined as follows:

1. A port closure for a tank, comprising in combination:
    a tank having defining walls, an exterior surface, an interior surface, an interior cavity and an access port;
    a closure member disposed within the interior cavity of the tank, the closure member having an access port engaging face larger than a cross-sectional area of the access port;
    an actuator coupled with the closure member, the actuator moving the closure member between a first position in which the access port engaging face closes the access port and a second position laterally spaced from the access port; and
    the closure member comprising two or more components capable of being inserted through the access port but incapable of individually covering the cross-sectional area of the access port, the two or more components being capable of being combined to collectively form the closure member.

2. The port closure for a tank as defined in claim 1, wherein a seal is mounted to one of the defining walls on the interior surface of the tank circumjacent the access port and the access port engaging face of the closure member.

3. The port closure for a tank as defined in claim 1, wherein the closure member has at least two layers, each of the at least two layers having a cut out portion that permits the layer to be inserted through the access port but renders the layer incapable of covering the cross-sectional area of the access port, the at least two layers being joined in face to face relation to collectively form the closure member.

4. The port closure for a tank as defined in claim 1, wherein the closure member has a primary component with a cut out portion that permits the primary component to be inserted through the access port but renders the primary component incapable of covering the cross-sectional area of the access port and at least one secondary component which, when combined with the primary component fills the cut out portion of the primary component to collectively form the closure member.

5. The port closure for a tank as defined in claim 1, wherein the two or more components are coupled with a hinge, such that the closure member is folded about the hinge for insertion through the access opening.

6. The port closure for a tank as defined in claim 1, wherein a guide is provided to guide movement of the closure member between the first position and the second position.

7. The port closure for a tank as defined in claim 6, wherein a pair of guide tracks are mounted to the defining walls on the interior surface of the tank, one of the pair of guide tracks being mounted on each of two opposed sides of the access port; and
    the closure member has a pair of opposed track engaging edges, the track engaging edges engaging the pair of guide tracks.

8. The port closure for a tank as defined in claim 1, wherein the two or more components interlocking members.

9. The port closure for a tank as defined in claim 8, wherein one of the two or more components have a male interlocking member and one of the two or more components have a female interlocking member.

10. The port closure for a tank as defined in claim 1, wherein the actuator is a telescopically extendible member.

11. The port closure for a tank as defined in claim 10, wherein the telescopically extendible member is a fluid cylinder connected by fluid lines to a remotely located fluid control system that controls the supply of fluid to the cylinder to telescopically expand and contract said cylinder.

12. The port closure for a tank as defined in claim 11, wherein the fluid cylinder is pneumatically operated.

13. The port closure for a tank as defined in claim 11, wherein the fluid cylinder is hydraulically operated.

14. A port closure for a tank, comprising in combination:
    a tank having defining walls, an exterior surface, an interior surface, an interior cavity and an access port;
    a pair of guide tracks, one of the pair of guide tracks being mounted to the defining walls on the interior surface of the tank on each of two opposed sides of the access port;
    a closure plate having a pair of opposed track engaging edges, the track engaging edges being engaged with the pair of guide tracks, the closure being movable along the guide tracks between a first position closing the access port and a second position laterally spaced from the access port, the closure plate including a first layer having a cut out portion that permits the first layer to be inserted through the access port but renders the first layer incapable of completely covering the cross-sectional area of the access port and a second layer having a cut out portion that permits the second layer to be inserted through the access port but renders the second layer incapable of completely covering the cross-sectional area of the access port, the first layer and the second layers being secured in face to face relation to collectively form the closure plate with an access port engaging face larger than the cross-sectional area of the access port, the first layer and the second layer having interlocking members which, when interlocked, make the access port engaging face and the opposed face of the closure plate planar;

a seal ring mounted to the defining walls on the interior surface of the tank circumjacent the access port, the seal ring sealingly engaging the access port engaging face of the closure plate when the closure plate is in the first position closing the access port; and a telescopically extendible actuator cylinder coupled with the closure, the cylinder being connected by fluid lines to a remotely located fluid control system that controls the supply of fluid to the cylinder to telescopically expand and contract the cylinder, thereby moving the closure between the first position and the second position.

\* \* \* \* \*